(12) United States Patent
Adams et al.

(10) Patent No.: US 7,710,501 B1
(45) Date of Patent: May 4, 2010

(54) TIME BASE CORRECTION AND FRAME RATE CONVERSION

(75) Inventors: Dale R. Adams, Gualala, CA (US); Laurence A. Thompson, Saratoga, CA (US)

(73) Assignee: Anchor Bay Technologies, Inc., Campbell, CA (US)

( * ) Notice: Subject to any disclaimer, the term of this patent is extended or adjusted under 35 U.S.C. 154(b) by 1695 days.

(21) Appl. No.: 10/889,855

(22) Filed: Jul. 12, 2004

(51) Int. Cl.
*H03L 7/00* (2006.01)

(52) U.S. Cl. ........................ 348/548; 348/547

(58) Field of Classification Search .......... 348/500–548
See application file for complete search history.

(56) References Cited

U.S. PATENT DOCUMENTS

| | | | |
|---|---|---|---|
| 4,997,321 A | 3/1991 | Adams | |
| 5,305,106 A * | 4/1994 | Fukushima et al. | 348/521 |
| 5,357,606 A | 10/1994 | Adams | |
| 5,436,668 A * | 7/1995 | Tults | 348/536 |
| 5,857,118 A | 1/1999 | Adams et al. | |
| 5,920,356 A | 7/1999 | Gupta et al. | |
| 6,167,164 A | 12/2000 | Lee et al. | |
| 6,219,747 B1 | 4/2001 | Banks et al. | |
| 6,285,801 B1 | 9/2001 | Mancuso et al. | |
| 6,380,978 B1 | 4/2002 | Adams et al. | |
| 6,385,692 B2 | 5/2002 | Banks et al. | |
| 6,393,505 B1 | 5/2002 | Scalise et al. | |
| 6,459,455 B1 | 10/2002 | Jiang et al. | |
| 6,473,476 B1 | 10/2002 | Banks | |
| 6,489,998 B1 | 12/2002 | Thompson et al. | |
| 6,515,706 B1 | 2/2003 | Thompson et al. | |
| 6,587,158 B1 | 7/2003 | Adams et al. | |
| 6,681,059 B1 | 1/2004 | Thompson | |
| 6,700,622 B2 | 3/2004 | Adams et al. | |
| 6,757,022 B2 | 6/2004 | Wredenhagen et al. | |
| 6,867,814 B2 | 3/2005 | Adams et al. | |
| 7,023,487 B1 | 4/2006 | Adams | |
| 7,027,099 B2 | 4/2006 | Thompson et al. | |
| 7,089,577 B1 | 8/2006 | Rakib et al. | |
| 7,206,025 B2 | 4/2007 | Choi et al. | |
| 7,236,209 B2 | 6/2007 | Martin | |
| 7,400,359 B1 | 7/2008 | Adams | |
| 2002/0149703 A1 | 10/2002 | Adams et al. | |
| 2006/0072037 A1 | 4/2006 | Wyman | |

FOREIGN PATENT DOCUMENTS

JP 2001-245155 9/2001

OTHER PUBLICATIONS

International Search Report PCT/US2006/034785 dated Apr. 4, 2007.
International Search Report PCT/US2007/084881 dated Mar. 25, 2008.
"Analog Devices CMOS 180 MHz DDS/DAC Synthesizer." AD9851, Rev. C, Analog Devices, Inc., www.analog.com, pp. 1-23 (1999).

\* cited by examiner

*Primary Examiner*—M. Lee
(74) *Attorney, Agent, or Firm*—Perkins Coie LLP (57) ABSTRACT

Apparatuses and methods are described for performing time base correction and frame rate conversion with respect to signals. An apparatus includes circuitry to synthesize an output video clock. The apparatus has circuitry that receives an input video synchronization signal. The apparatus has circuitry to change a frequency of the output video clock based on an intended number of video clock cycles per input vertical period and a period of the input video synchronization signal.

18 Claims, 11 Drawing Sheets

TIME BASE CORRECTION AND FRAME RATE CONVERSION

FIELD

Embodiments of the invention relate to the field of video processing. More particularly, embodiments of the invention relate to time base correction of video signals, especially from unstable sources. Embodiments of the invention also relate to frame rate conversion of video signals to optimize the match between source frame rate and display frame rate.

BACKGROUND

A number of formats exist for video signals, including television signals. For example, conventional television in the United States uses the 525 line/60 Hertz National Television System Committee ("NTSC") standard, while Europe uses a 625 line/50 Hertz standard. Television formats in the United States include 480i, 480p, 720p, and 1080i, wherein the number indicates the number of scan lines, "i" indicates an interlaced signal, and "p" indicates a progressive scan signal. Motion pictures are recorded on film at 24 frames per second (i.e., 24 Hertz).

For an interlaced television format, each frame is displayed as two sets of spaced lines that are successively scanned. One set of lines comprises even-numbered lines and the other set of lines comprises odd-numbered lines. Each set of spaced lines is referred to a field. The persistence of vision makes two interlaced successive fields appear to be a frame. The phrase "vertical period" as used herein means a field for an interlaced video format and a frame for a non-interlaced video format.

Figure 1:
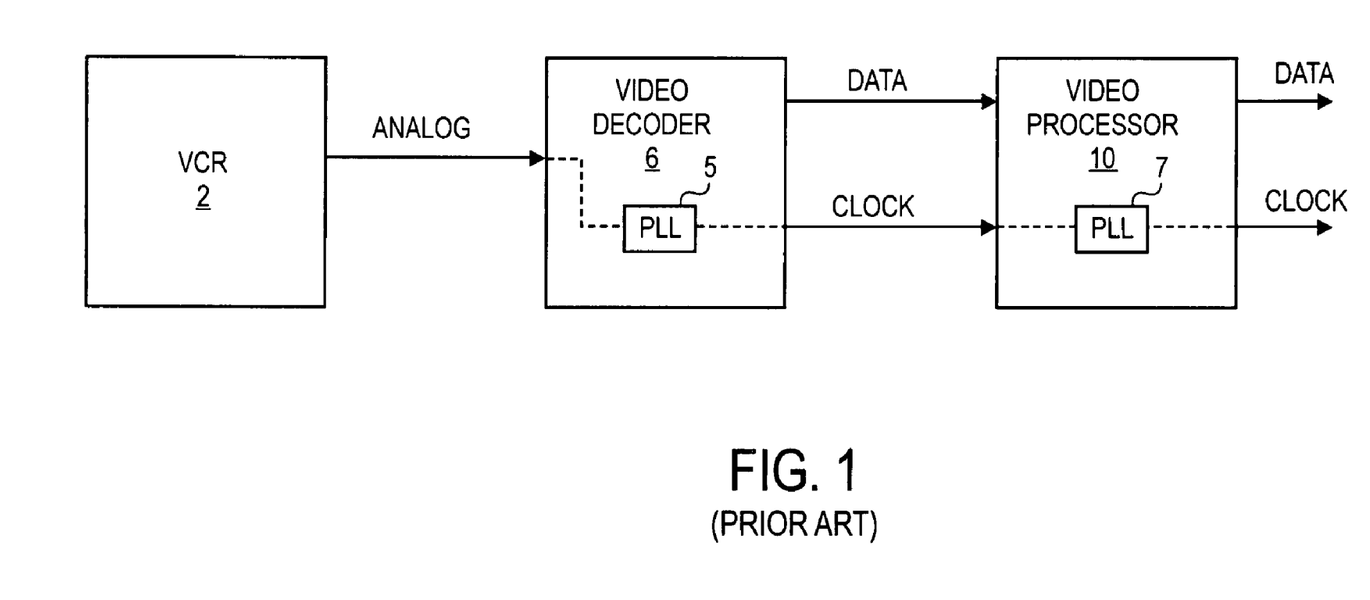
FIG. 1 shows a prior art video system.

FIG. 1 shows an example of a prior art video system that includes a video cassette recorder ("VCR") 2, a video decoder 6, and a video processor 10. Video decoder 6 digitizes the analog video output signal from VCR 2 to form a digital output signal that includes a data signal and a clock. A phase lock loop ("PLL") circuit 5 of video decoder 6 generates a clock signal from a horizontal synch signal that is part of the analog output of VCR 2. The clock signal and the digital output signal from video decoder 6 are sent to video processor 10.

Prior art video processor 10 converts video data and clock signals from one format to another format using phase-lock loop circuitry 7 that locks to the input clock. For example, the video processor 10 can receive a digital video signal in a 480p format and covert the signal to a 720p format. The frequency of the output clock is proportional to the frequency of the input clock. For the example, the input and output clocks are pixel clocks. For a stable 480p input signal, the frequency of the input signal is 27 megahertz. For a stable 480p input signal, the frequency of the output clock for a 720p output signal is 74.1 megahertz.

Unfortunately, input video signals are not always stable. For example, prior art video cassette recorders ("VCR") typically produce unstable video signals. Typically, VCRs have very unstable horizontal synch signals and somewhat unstable vertical synch signals. The unstable VCR signals have varying pulse widths and varying frequencies.

One problem with the prior art video system of FIG. 1 is that an unstable video input signal produces an unstable video output signal. For example, if the horizontal synch signal that is provided as an output from VCR 2 has a varying frequency, then the clock output of video decoder 6 will have a varying frequency because the PLL circuitry 5 locks to the horizontal synch signal of VCR 2. Likewise, the output clock of video processor 10 will have a varying frequency when the output clock of video decoder 6 has a varying frequency, given that PLL circuitry 7 locks to the output clock of video decoder 6. This can result in a video signal with poor stability at the output of video processor 10.

Figure 2:
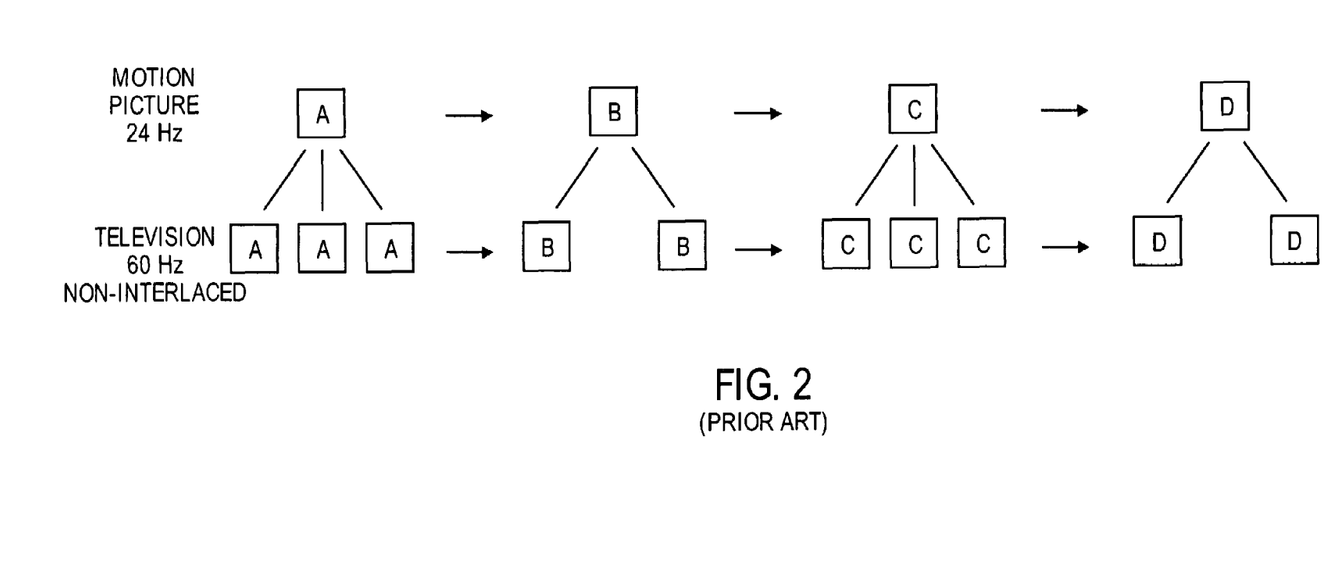
FIG. 2 illustrates a prior art 3:2 pulldown technique for converting a 24 Hertz motion picture signal to a 60 Hertz deinterlaced television signal.

Various prior art techniques have been used to convert a motion picture 24 Hertz signal to a television signal. For example, in the United States, a 3:2 pulldown technique has been used to convert the 24 Hertz motion picture signal to a 60 Hertz non-interlaced (progressive scan) television signal. FIG. 2 illustrates the prior art 3:2 pulldown technique. Each film frame is tripled or doubled in an alternating pattern to "fit" within the 60 Hertz non-interlaced (progressive scan) television signal. One disadvantage of the 3:2 pulldown technique is that uneven motion is produced given that the film frames appear in a pattern of 3 frames, then 2 frames, then 3 frames, etc.

Europe uses a different technique for converting motion picture signals. Video processors in Europe speed up the 24 Hertz motion picture rate to a 25 Hertz rate, which is then converted to a 50 Hertz rate, which is the European standard television rate. One disadvantage of this European technique is that motion pictures appear 4% faster on European television.

SUMMARY

An apparatus is described that includes circuitry to synthesize an output video clock. The apparatus has circuitry that receives an input video synchronization signal. The apparatus has circuitry to change a frequency of the output video clock based on an intended number of video output clock cycles per input vertical period and a period of the input video synchronization signal.

A method for time base correction is described. A comparison is made on an input vertical period by input vertical period basis of an intended number of output clock cycles per input vertical period with an actual number output clock cycles per input vertical period. An error number is generated based on the comparison. The error number can be positive, negative, or zero. The error number is used to generate a frequency tuning number. An output clock is synthesized based on the frequency tuning number.

A method for frame rate conversion is described. An intended number of output clock cycles per input vertical period is calculated by dividing an intended output vertical synchronization frequency by an input vertical synchronization frequency and multiplying the result by an intended number of video output clock cycles per output vertical period. A comparison is done on an input vertical period by input vertical period basis of the intended number of output clock cycles per input vertical period with an actual number of output clock cycles per input vertical period. An error number is generated based on the comparison. The error number can be positive, negative, or zero. An error number is used to generate a frequency tuning number. An output video clock is synthesized based on the frequency tuning number.

Other features and advantages of embodiments of the invention will be apparent from the accompanying drawings and from the detailed description that follows below.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Apparatuses and methods are described for performing time base correction and frame rate conversion with respect to signals.

As will be described in more detail below, instead of locking an output clock to an input clock, embodiments of the invention synthesize an output clock. Adjustments are then made to the frequency of the output clock based on (1) an intended number of output clock cycles per input vertical period and (2) a period of an input vertical synchronization signal.

This scheme helps to provide a more stable output clock. If the period of the input vertical synchronization signal varies over time—as sometimes occurs with an unstable video source such as a VCR—an embodiment of the invention provides error indications that lead to an adjustment in the output clock. The input vertical synchronization signal provides more stability than the input horizontal synchronization signal.

Moreover, embodiments of the time base correction technique allow the output vertical period to be locked to the input vertical period. Vertical periods are not dropped or repeated. In short, embodiments of the invention provide a relatively stable form of time base correction.

Embodiments of the invention also provide an output clock for frame rate conversion. An intended frame rate is chosen that is an integer multiple of a frame rate of a video source. For example, motion pictures have a frame rate of 24 Hertz. An example of an integer multiple of that frame rate would be a frame rate of 72 Hertz, which is 24 Hertz times the integer three. An output clock is then synthesized. For example, assuming an input vertical synchronization signal with a nominal frequency of 60 Hertz and an intended output vertical synchronization signal frequency of 72 Hertz, the output clock will have a frequency based on (72 Hertz/60 Hertz) times an intended number of video output clock cycles per output vertical period. The frequency of the output clock will be adjusted based on variations with respect to the period of the input vertical synchronization signal.

The frame rate conversion technique of embodiments of the invention provides a relatively stable output clock. Frames and fields are locked and are not dropped.

Another intended advantage of embodiments of the invention is that the frequency correction/adjustment circuitry used in time base correction can also be used as part of frame rate conversion.

Figure 3:
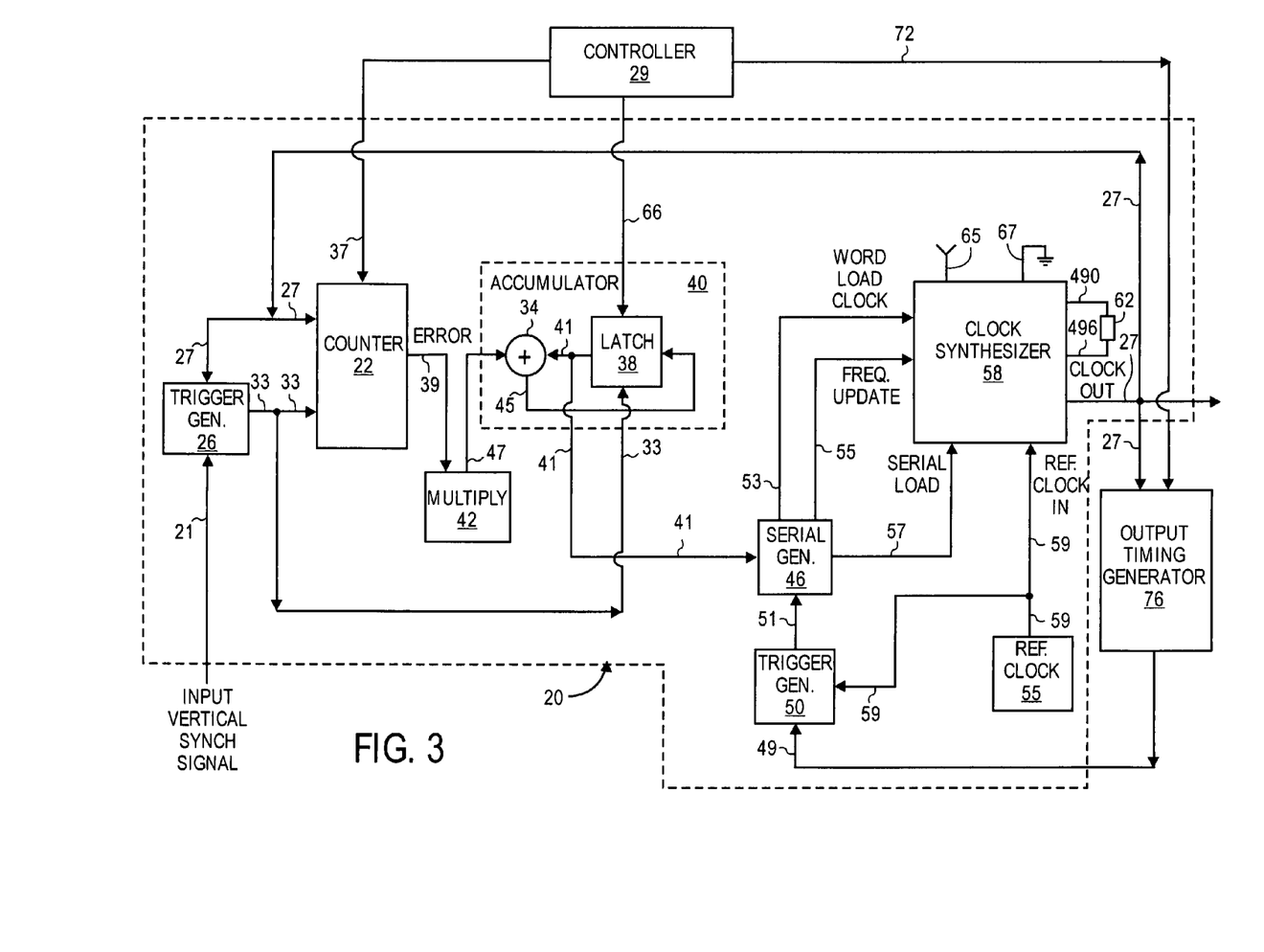
FIG. 3 is a block diagram of frequency correction circuitry used in time base correction and frame rate conversion.

FIG. 3 is a block diagram of frequency correction circuitry 20, also referred to as frequency adjustment circuitry 20. Circuitry 20 performs time base correction. Circuitry 20 can also be used as part of a frame rate conversion technique. Thus circuitry 20 integrates both time base correction and frame rate conversion.

Circuitry 20 includes clock synthesizer circuitry 58 that synthesizes output clock 27, also referred to as clock out 27. The clock output signal 27 is a relatively stable clock signal in the form of a square wave.

For one embodiment of the invention, the output clock 27 is a pixel clock. The pixel clock is used to scan through the pixels for each vertical period in an output video signal. For an interlaced format, a vertical period is a field. For a non-interlaced format, a vertical period is a frame.

For a digital television signal using the 480p format, there are 525 pixels in the vertical direction (including 45 overhead pixels) and 858 pixels in the horizontal direction (including 138 overhead pixels). The number of vertical pixels times the number of horizontal pixels for the 480p format is 525×858=450,450 pixels. To illuminate each of the pixels in a single video vertical period there needs to be 450,450 clock cycles for the vertical period. The video vertical period is delineated by the leading edges of successive pulses of the input vertical synchronization signal, also referred to as the input vertical synch signal. Thus, there needs to be 450,450 clock cycles between the leading edges of the vertical synch signal pulses. Other video formats with different numbers of pixels require different numbers of clock cycles.

Frequency correction circuitry 20 is controlled by controller 29. For one embodiment, controller 29 includes a read-only memory ("ROM") (not shown) that stores fixed values that are read from ROM based on the operating mode that is either preset or set by the user. For example, if the user selects a 1080i output video format, then controller 29 reads from its ROM the setup values for the 1080i output video format. For one embodiment, controller 29 includes a microprocessor or a microcontroller. For another embodiment, controller 29 includes a state machine.

Controller 29 places a binary number on lines 37 that represents an intended number of output clock cycles per input vertical period. That number on lines 37 is loaded into counter 22 upon receipt by counter 22 of each trigger pulse on line 33. Controller 29 may keep the same number on lines 37 during subsequent trigger pulses on line 33. If, however, the video format changes, controller 29 may change the number on lines 37. For a 480p video format, for example, the number is 450,450 in base 10, but appears in binary form on line 37. For other video formats, other numbers may be used.

Upon the start of operations, controller 29 places on lines 66 a binary initial nominal frequency tuning number that is loaded into latch 38 when latch 38 receives a first trigger pulse on line 33. For trigger pulses on line 33 after the first trigger pulse, lines 66 are not used to load latch 38. The initial nominal frequency tuning number stored in latch 38 produces a value on output lines 41 that when processed by serial generator 46 and clock synthesizer chip 58 results in an output clock 27 having a frequency close to an intended nominal frequency. In other words, the initial nominal frequency tuning number loaded into accumulator latch 38 via lines 66 "primes" the frequency correction circuitry 20 in order to start circuitry 20 with a frequency of output clock 27 close to an intended nominal frequency.

Controller 29 also sends timing information on lines 72 to output timing generator 76.

The output clock 27 is applied as an input to counter 22 to step counter 22 in order to cause counter 22 to continuously decrement. In other words, counter 22 is stepped down one count for each pulse of output clock 27.

A trigger signal 33 applied to counter 22 causes counter 22 to be reloaded with a number that represents the intended number of output clock cycles per input vertical period. The trigger signal 33 comes from the trigger generator 26. The trigger signal 33 is derived from the input vertical synch signal 21 that is applied as an input to trigger generator 26.

Figure 4:
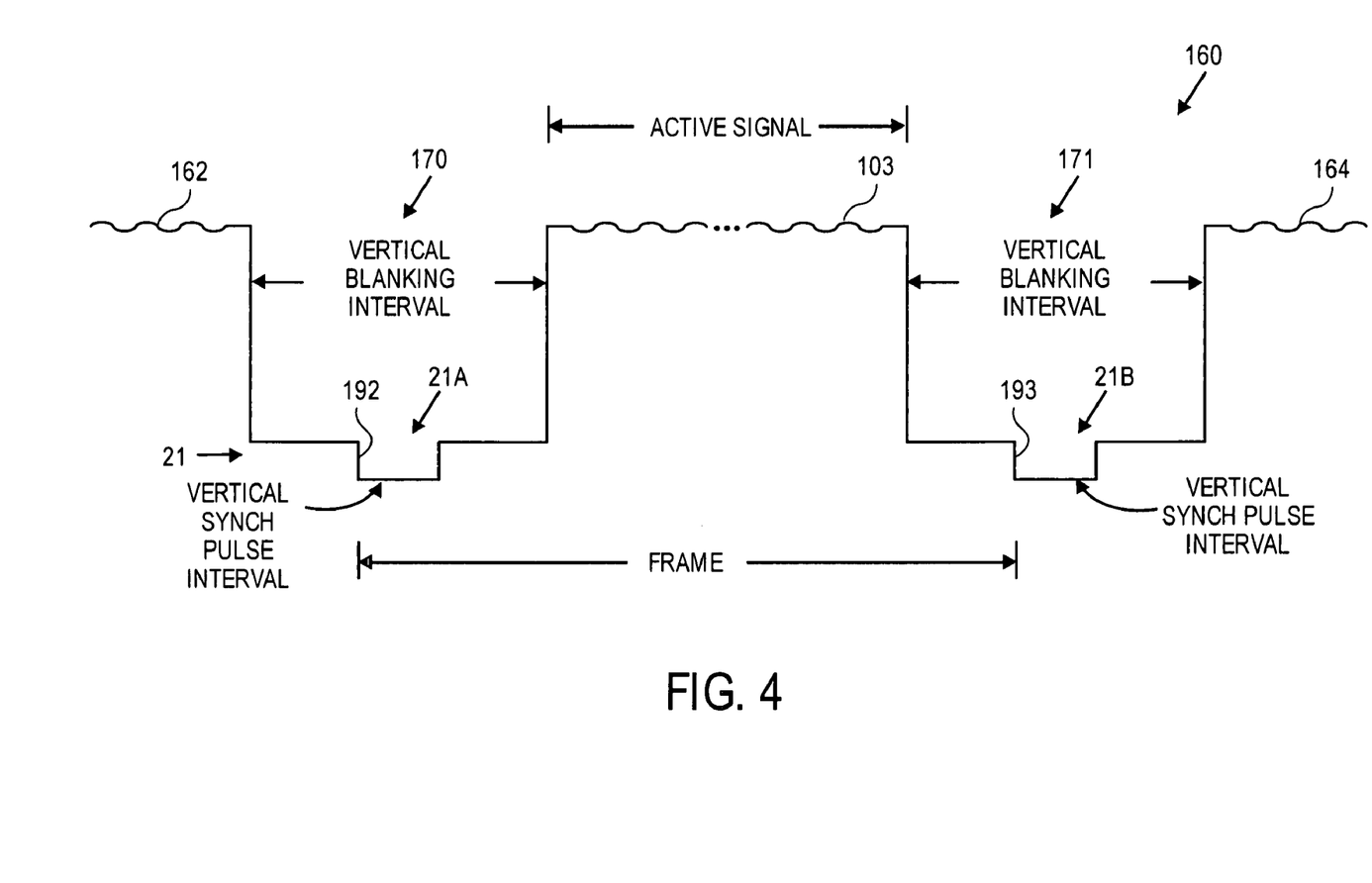
FIG. 4 shows a video signal with active signals, vertical blanking intervals, and vertical synchronization pulses.

The input vertical synch signal 21 is used to trigger the vertical scanning circuits of a television. Input vertical synch signal 21 is part of an input video signal 160 shown in FIG. 4 that includes vertical blanking intervals 170 and 171 and also active signals 162, 163, 164, etc. containing the video content information for display on a video screen. Input vertical synch signal 21 is comprised of vertical synch pulses 21A, 21B, etc. Vertical synch pulse 21A has a leading edge 192 that indicates the beginning of a new vertical period (e.g., a frame) and the ending of a previous vertical period. Vertical synch pulse 21B has a leading edge 193 that indicates the end of the vertical period and the beginning of yet another vertical period.

Figure 5:
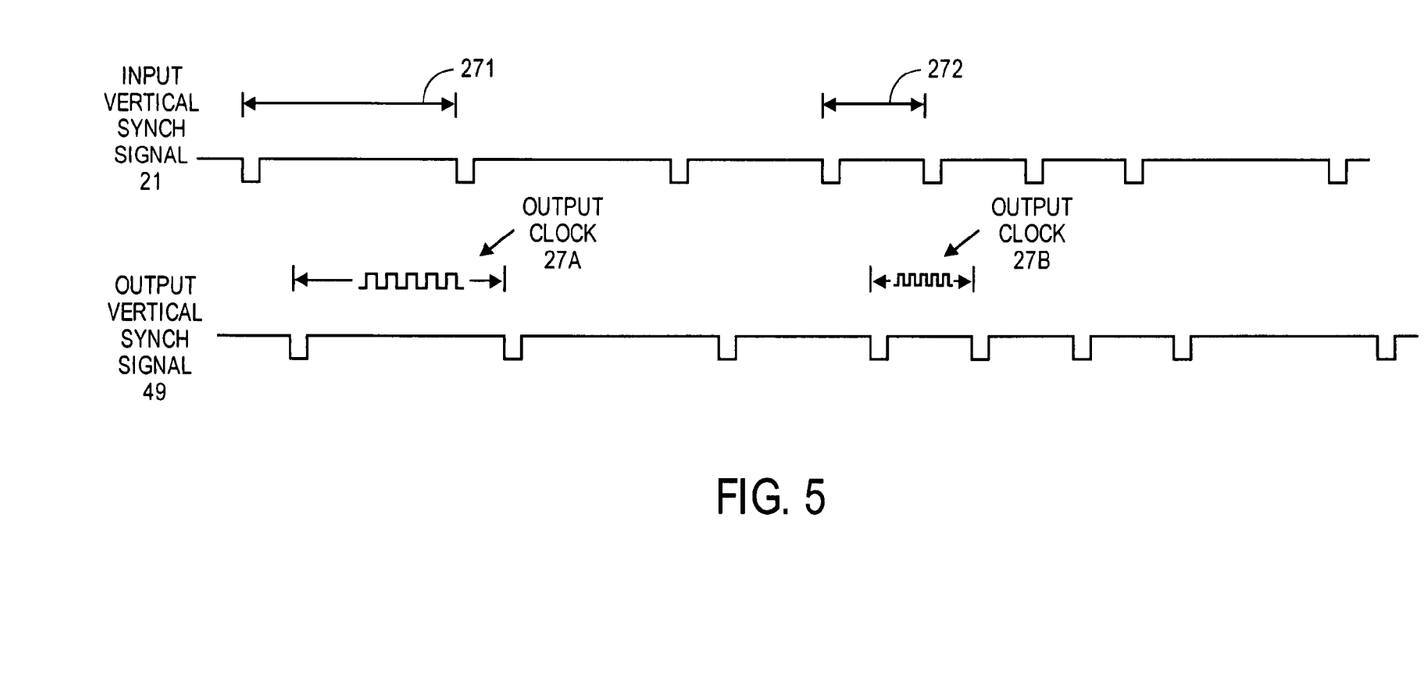
FIG. 5 shows input and output vertical synchronization signals that vary in frequency and also shows an output clock.

FIG. 5 shows input vertical synch signal 21 over time. Although input vertical synch signal 21 has a nominal frequency of 60 Hertz for one embodiment, the frequency (and period) of input vertical synch signal 21 can change due to unstable sources, such as videocassette recorders. For unstable sources, the period between input vertical synch pulses can get smaller or larger. For example, a large period 271 contrasts with a shorter period 272 for vertical synch signal 21. The period of an input vertical synch signal determines the length in time of an input vertical period (e.g., a frame for a non-interlaced signal).

Figure 6:
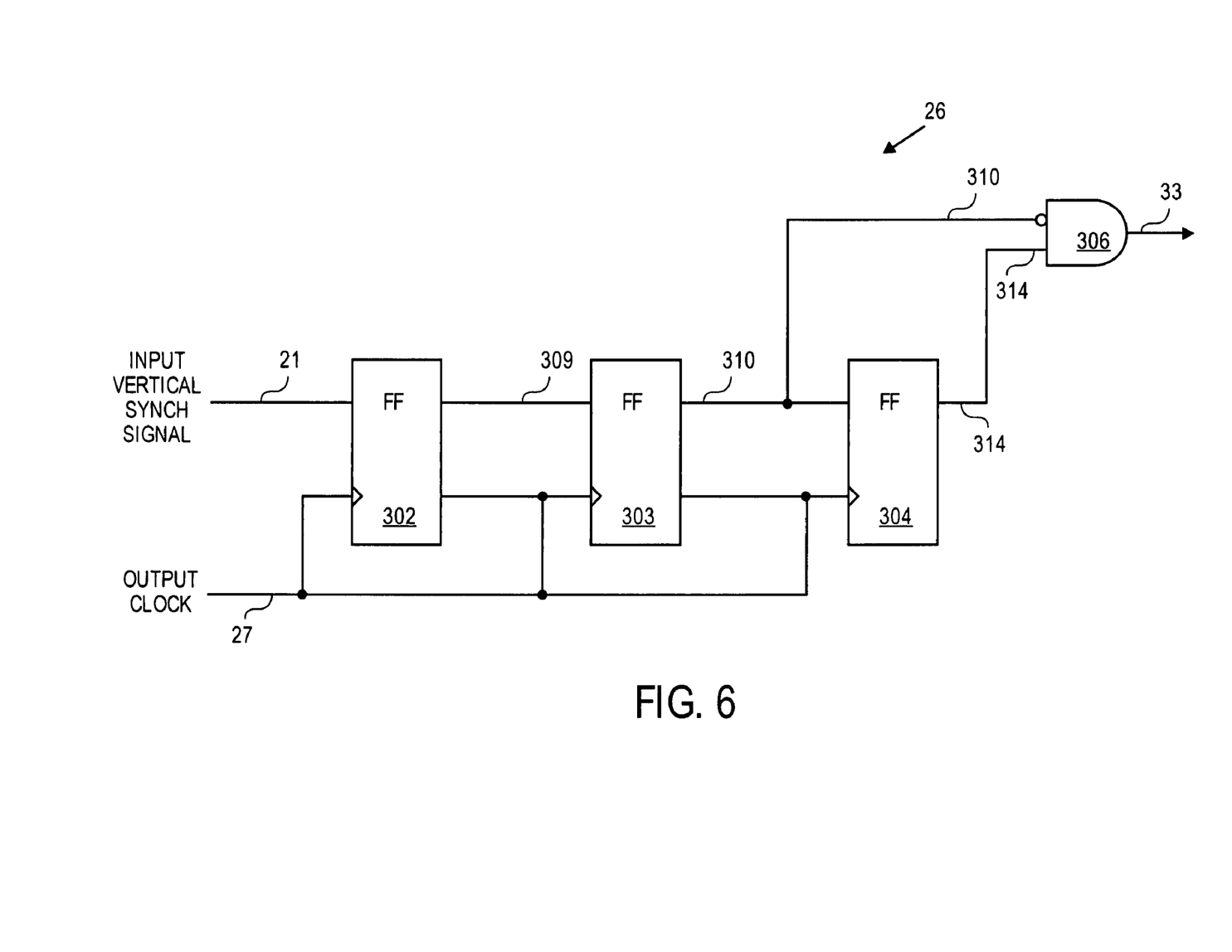
FIG. 6 is a diagram of a trigger generator that receives an input vertical synchronization signal.

FIG. 6 shows the components of trigger generator 26. Output clock 27 is supplied to flip-flops 302, 303, and 304. Input vertical synchronization signal 21 is applied to flip-flop 302. Flip-flop 302 has an output 309 that is supplied to flip-flop 303. Flip-flop 303 has an output 310 that is supplied to flip-flop 304. Output 310 is also inverted and applied to AND gate 306. Flip-flop 304 has an output 314 that is supplied to AND gate 306. The output 33 of AND gate 306 is the output of trigger generator 26.

The output 33 of trigger generator 26 is a trigger pulse that is synchronized to output clock 27. The pulse width of the trigger pulse 33 is the same as the time between pulses of output clock 27. Trigger pulse 33 is applied to counter 22 of FIG. 3 and reloads counter 22, which indicates the end of one input video vertical period and the beginning of a next input video vertical period.

Reloading of the number on lines 37 (i.e., the intended number of output clock cycles per input vertical period) by counter 22 occurs upon the receipt by counter 22 of each subsequent trigger pulse on line 33.

The time between each subsequent trigger pulse on line 33 is the period of the input vertical synchronization signal 21. The counter 22 is decremented by the pulses of output clock 27 in between each reloading of counter 22.

The counter 22 does not stop counting. At the point in time when counter 22 receives a trigger pulse on line 33, the output 39 of counter 22 is an error number. The error number on lines 39 is a binary number that represents the difference between the intended number of output clock cycles per input vertical period (supplied as input 37) and the actual number of clock cycles 27 applied to counter 22 during an input vertical period. That is because trigger generator 26 generates trigger pulses 33 that delineate an input vertical period. The error number on lines 39 can be a positive number, a negative number, or zero.

For an alternative embodiment of the invention, multiple input vertical periods are used in calculating an error value instead of just a single input vertical period. The alternative method has the affect of averaging out vertical period to vertical period variations and spreading out the adjustment of the frequency of the output clock 27 over multiple vertical periods.

For the embodiment of FIG. 3, the error number on lines 39 is provided as an input to multiplication unit 42. Multiplication unit 42 converts that error number—which represents the difference in cycles per period—into a frequency error number, which represents the difference in frequency per period. Multiplication unit 42 multiplies the error number on lines 39 by 1,024, which is $2^{10}$. For one embodiment, this multiplication is accomplished by using a shift register (not shown) that shifts the error number left by 10 bits and adds 10 zeroes. The resulting number is the frequency error number, which is a binary number that is placed on output lines 47.

Although for one embodiment of the invention a multiplier of 1,024 is used for either 60 Hertz or 50 Hertz input vertical synch signals, in fact the correct multiplier should be 1,430 when a 60 Hertz input vertical synch signal 21 is used. The correct multiplier should be 1,193 when a 50 Hertz input vertical synch signal 21 is used. Multiplication circuit 42 instead uses a multiplication factor of 1,024 in order to simplify the logic circuitry. Logic circuitry more complex than a shift register would be required in order to generate a multiplication factor of 1,430 (or 1,193).

Nevertheless, for alternative embodiments, multiplication circuitry 42 multiplies the error number on lines 39 by 1,430 (or 1,193) instead of 1,024 and accordingly uses more complex circuitry.

The rationale for multiplication circuitry 42 is as follows. If counter 22 measures an error of one clock cycle in an input vertical period, then that is the equivalent of a 60 Hertz error in the output clock 27 (for a 60 Hertz input signal). This is the minimum error that can be measured and is therefore the granularity of the required correction factor. The error number output 39 from counter 22 must be converted from a clock per input vertical period error count to the Delta Phase value discussed below in connection with clock synthesizer 58. For a multiplier of 1,024, each value of one clock appearing on lines 39 is converted to a Delta Phase value of 1,024.

For the embodiment of the invention that uses a multiplication factor of 1,024 in multiplication unit 42, the frequency adjustment done by circuitry 20 is accordingly spread out over several vertical periods. The use of a 1,024 multiplication factor makes circuitry 20 an overdamped system. Circuitry 20 accordingly always undershoots and does not overshoot with respect to frequency adjustment or correction.

The frequency error number on lines 47 is provided to adder 34 of accumulator 40. Latch 38 of accumulator 40 also supplies an input 41 to adder 34. As discussed above, latch 38 is initially loaded with a binary number that represents the initial nominal frequency tuning number. The binary number stored in latch 38 is referred to as the latched frequency sum number. The frequency error number on lines 39 is added by adder 34 of accumulator 40 to the latched frequency sum number supplied by latch 38 on lines 41. The frequency error number that is sent to adder 34 via line 47 has the correct format for correcting the latched frequency sum number for the next input vertical period.

The result of the addition is a binary frequency sum number on lines 45 that is supplied as an output from adder 34. When latch 38 receives a trigger pulse on line 33 from trigger generator 26, the frequency sum number on lines 45 is latched into latch 38 to become the new latched frequency sum number stored in latch 38.

The latched frequency sum number on lines 41 (which is the output from latch 38) is supplied to serial generator 46.

Figure 7:
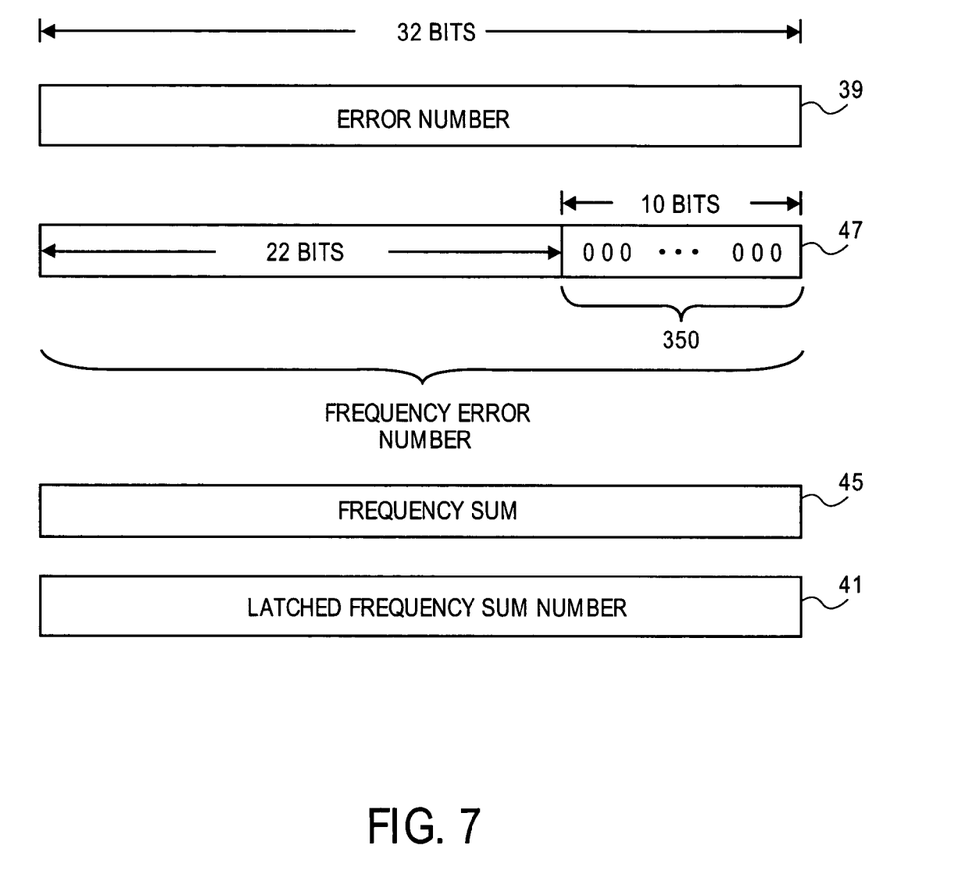
FIG. 7 shows an error number, a frequency error number, a frequency sum, and a latched frequency sum number.

FIG. 7 illustrates the binary numbers processed by accumulator 40 and multiplication unit 42. The binary numbers are referenced herein by the line numbers on which those binary numbers appear. For one embodiment, the error number 39, the frequency error number 47, the frequency sum 45, and the latched frequency sum number 41 are each a binary number comprised of 32 bits. FIG. 7 shows the right-most 10 least significant bits 350 of frequency error number 47 that are the result of the multiplication of error number 39 by 1,024.

The latched frequency sum number 41 is sent to serial generator 46. The latched frequency sum number 41 is converted to a serial frequency tuning number 57 by serial generator 46. The serial frequency tuning number 57 is a binary number that is serially loaded into clock synthesizer chip 58.

Serial generator 46 operates as follows. Serial generator 46 takes the 32-bit latched frequency sum number 41 and adds 8 upper bits (i.e., the 8 most significant bits) to produce a 40 bit serial frequency tuning number 57. Those 8 upper bits are control bits for clock synthesizer chip 58 that control output phase, a six-times reference clock multiplier, a power-down enable, and a loading format. The lower 32 bits of the serial frequency tuning number 57 correspond to the 32-bit latched frequency sum number 41 and determine the frequency of the clock 27 synthesized by clock synthesizer 58.

Serial generator 46 generates a word load clock 53 that is sent to synthesizer chip 58. The word load clock 53 clocks the serial frequency tuning number 57 into synthesizer chip 58. Serial general 46 generates a frequency update pulse 55 that informs the synthesizer chip 58 that the serial generator 46 is done sending the serial frequency tuning number 57 to synthesizer chip 58.

The serial generator 46 begins transferring its serial load 57 upon the application of a trigger signal 51 to serial generator 46. Trigger pulse 51 is generated by trigger generator 50.

One of the inputs to trigger generator 50 is output vertical synchronization signal 49, which is shown in FIG. 5. The output vertical synchronization signal 49 is the vertical synchronization signal that is sent to the video display unit. For one embodiment of the invention, the output vertical synchronization signal 49 is similar to the input vertical synchronization signal 21, but the output vertical synchronization signal 49 is shifted in time relative to the input vertical synchronization signal 21. Thus, for example, if the input vertical synchronization signal 21 comes from an unstable video source and has a frequency that varies, then the output vertical synchronization signal 49 has a frequency that varies in a similar manner.

The output vertical synchronization signal 49 is generated by output timing generator 76 shown in FIG. 3. One of the inputs to output timing generator 76 is the clock output 27. Another input to output timing generator is timing information from controller 29.

FIG. 5 also shows the output clock 27A from circuitry 20 for one of the vertical periods and output clock 27B from another vertical period. In order for output clock 27B to have the same number of clock cycles per vertical period as output clock 27A, the frequency of output clock 27B needs to higher than the frequency of output clock 27A. This change of frequency is accomplished by the frequency correction circuitry 20 of FIG. 3.

Trigger generator 50 of FIG. 3 also receives as an input a reference clock 59 that is generated by a reference clock generator 55. For one embodiment of the invention, reference clock signal 59 is a 30 megahertz clock signal generated by a 30 megahertz oscillator in reference clock generator 59. Reference clock generator 55 also supplies the 30 megahertz reference clock signal 59 to clock synthesizer chip 58.

Figure 8:
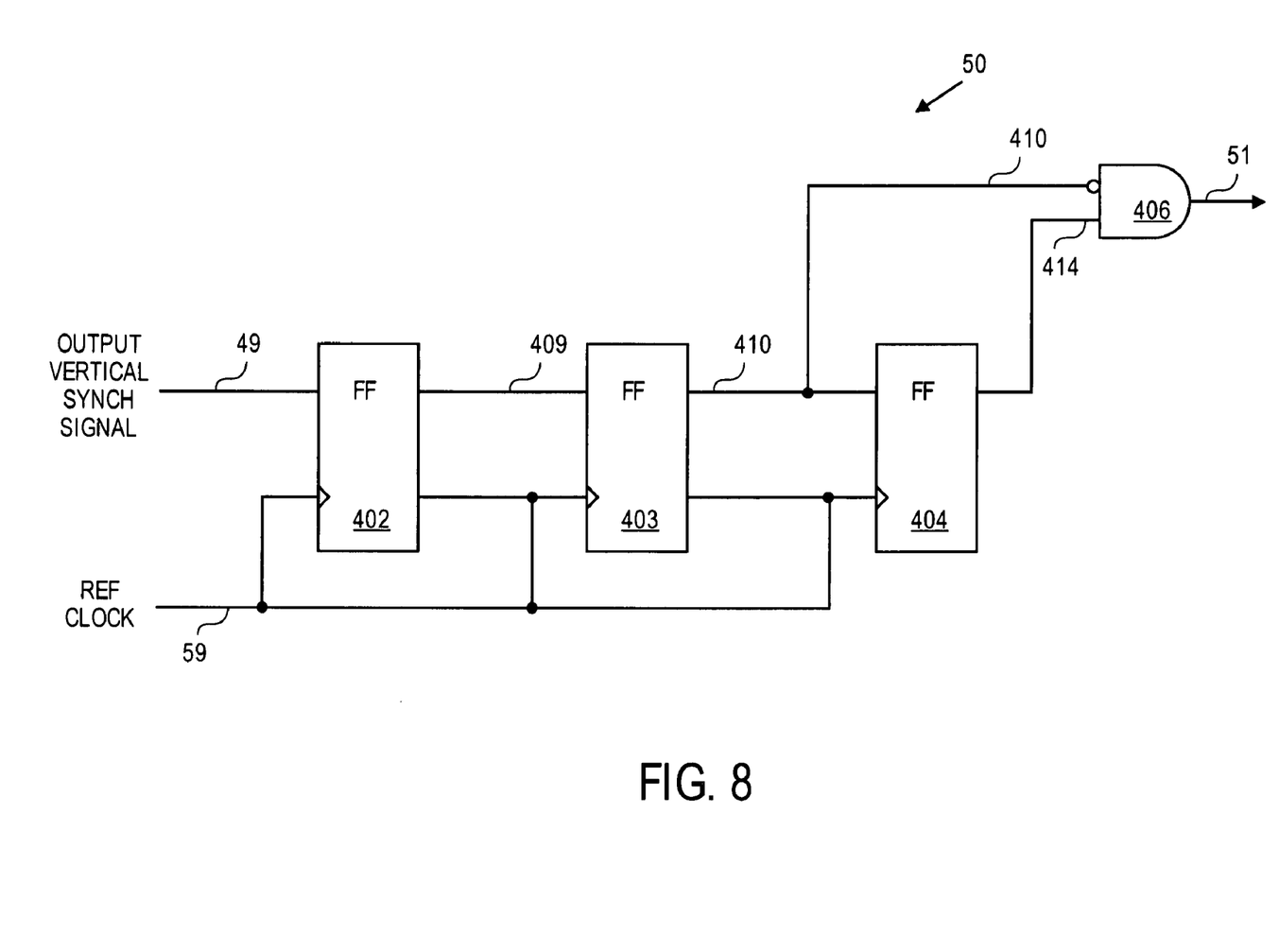
FIG. 8 is a diagram of a trigger generator that receives an output vertical synchronization signal.

FIG. 8 is a block diagram of trigger generator 50. The 30 megahertz reference clock signal 59 is applied as a clocking input to each of the flip-flops 402, 403, and 404. The output vertical synch signal 49 is applied as an input to flip-flop 402. The output 409 of flip-flop 402 is applied to flip-flop 403. Flip-flop 403 in turn generates signal 410. An inverted signal 410 is applied to an AND gate 406. The output 410 of flip-flop 403 is also applied to an input of flip-flop 404. The output of flip-flop 404 is a signal 414 that is applied to AND gate 406. The output of AND gate 406 is a trigger signal 51 that is applied to serial generator 46.

Once serial generator 46 receives the trigger signal 51, then serial generator 46 begins sending out the serial load 57 to clock synthesizer chip 58.

An output clock 27 is synthesized by clock synthesizer circuitry 58 based on the 32-bit latched frequency sum number 41 portion of the 40-bit serial frequency number 57. For one embodiment of the invention, clock synthesizer chip 58 is a prior art model AD9851 complementary metal oxide semiconductor ("CMOS") 180 Megahertz direct digital synthesis ("DDS") digital-to-analog converter ("DAC") synthesizer chip supplied by Analog Devices, Inc. of Norwood, Mass. The clock synthesizer chip 58 when referenced to an accurate clock source can generate a stable frequency and phase-programmable digitized analog output sine wave. The sine wave is internally converted to a square wave in order to provide clock output 27.

Figure 9:
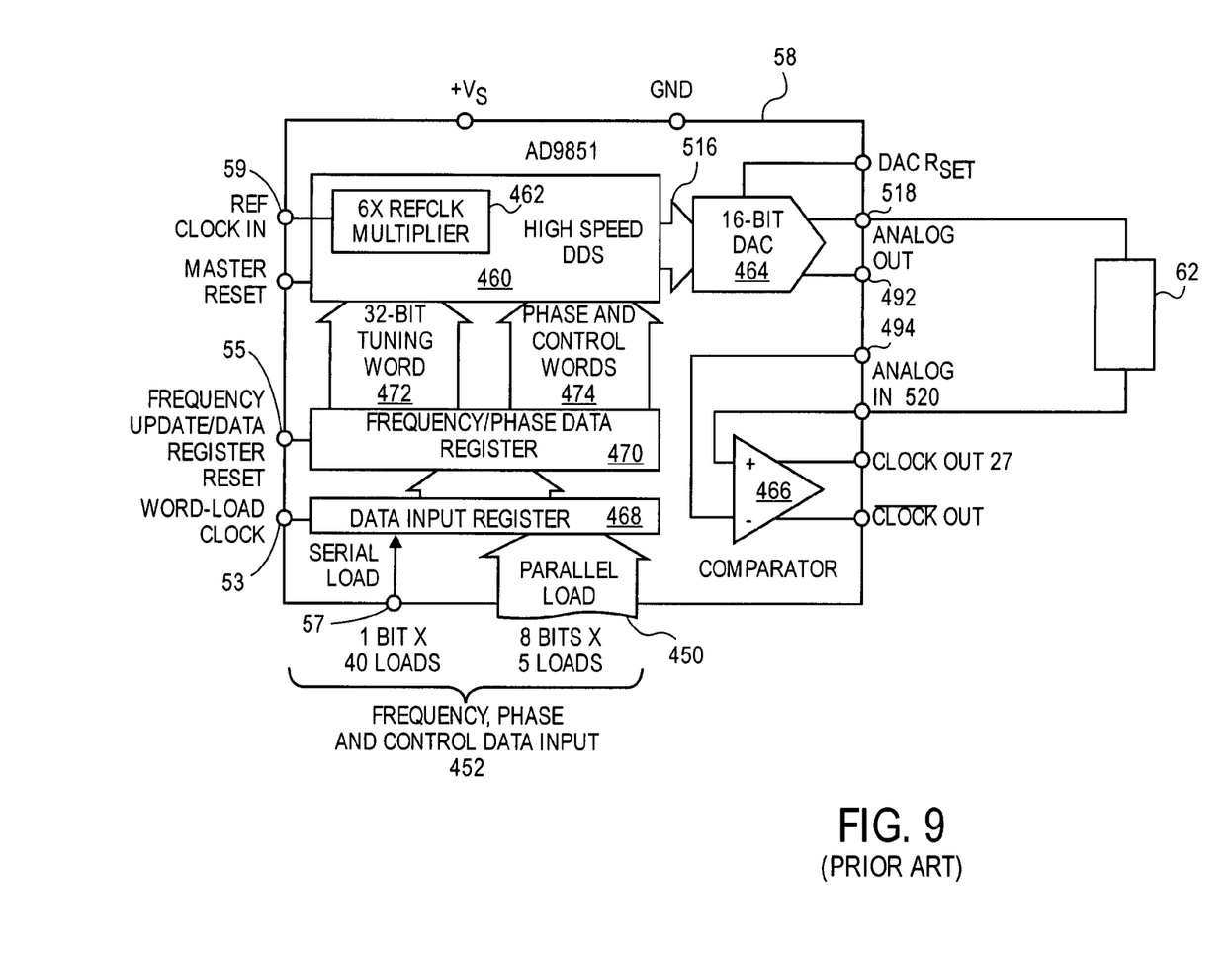
FIG. 9 is a block diagram of a prior art clock synthesizer chip.

FIG. 9 is a block diagram of the prior art clock synthesizer chip 58. For one embodiment, a 30 megahertz reference clock 59 is supplied to clock synthesizer 58. Circuitry 462 is a six-times multiplier that multiplies the 30 megahertz reference clock 59 to produce a 180 Megahertz internal clock rate, which is used for one embodiment as the system clock for chip 58.

Clock synthesizer 58 includes a frequency, phase, and control data input interface 452. The parallel load format—which is used by an alternative embodiment of the present invention—comprises five interactive loads at port 450 of respective 8-bit words. One word is a control word. The remaining four words comprise the 32-bit frequency tuning word 472 used by the clock synthesizer 458.

For one embodiment, serial loading of the serial frequency number 57 is accomplished via a 40 bit serial data stream entering through one of the parallel input bus lines of chip 58. The serial frequency number is supplied to chip 58 on one bus line and is loaded with 40 loads. The frequency update/data register reset pin 55 and word load clock pin 53 are used in conjunction with the serial loading.

The serial frequency number is loaded into data input register 468. The data is in turn sent to frequency/phase data register 470. The upper eight bits of the 40 bit serial data stream comprise phase and control words 474 that are sent to the high-speed direct digital synthesis ("DDS") circuitry 460. The 32-bit tuning word 472 is extracted from the 40 bit frequency tuning number 57 and sent to the high speed DDS circuitry 460 for processing. The 32-bit tuning word 472 is the same as the binary 32-bit latched frequency sum number 41.

The output 516 of the high speed DDS circuitry 460 is sent to the 10 bit digital-to-analog converter ("DAC") 464 for conversion from digital to analog. The output 518 of the 10 bit DAC 464 is sent to low pass filter 62. The output 520 of low pass filter 62 is sent to comparator 466, which produces clock output 27. The combination of the low pass filter 62 and the comparator 466 converts the sine wave output 518 of the 10 bit DAC 464 to the square wave clock output signal 27.

The relationship between the frequency of the clock output 27, the frequency of the system clock of synthesizer chip 58, and the 32-bit tuning word 472 of the clock synthesizer 58 is determined by the following expression:

$$F_{out} = (\text{Delta Phase} \times \text{System Clock})/2^{32}$$

wherein Delta Phase equals the decimal value of the 32-bit tuning word 472. For one embodiment, the frequency of the System Clock is 180 Megahertz. $F_{out}$ equals the frequency of the output clock 27 in Megahertz.

Frequency correction circuitry 20 of FIG. 3 operates repeatedly to produce output clock 27. The operations described above are repeated. Circuitry 20 thus adjusts the frequency of the output clock repeatedly.

Figure 10:
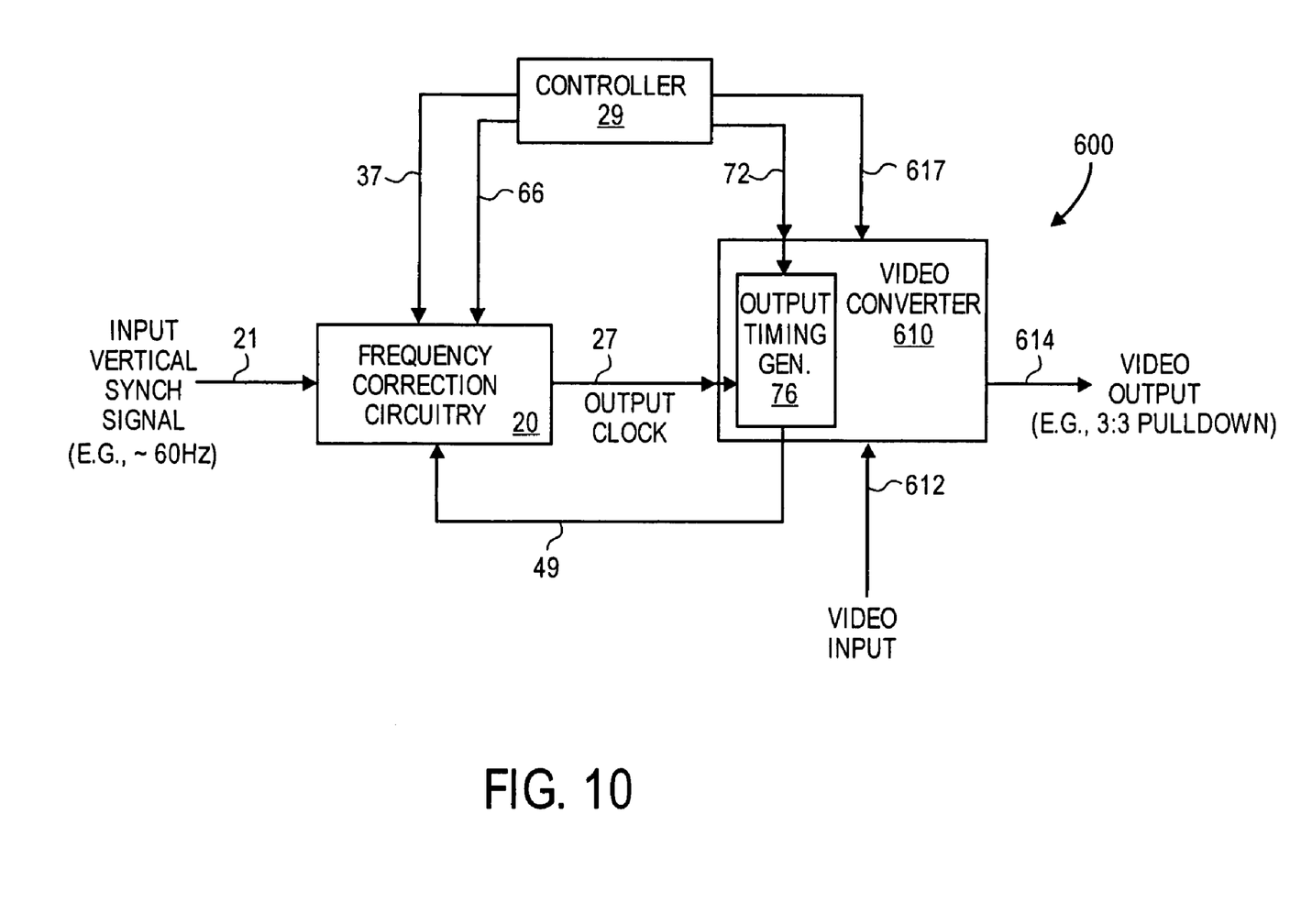
FIG. 10 is a block diagram of an apparatus for performing frame rate conversion.

FIG. 10 illustrates circuitry 600 in block diagram form for performing frame rate conversion. Circuitry 600 includes a controller 29, frequency correction circuitry 20, and a video converter 610 that includes output timing generator 76.

Input video source signal 612 is sent to video converter 610 for conversion to a video output signal 614. For one embodiment, the video output signal 614 has a display rate of 72 Hertz and is sent to a television or other video display or monitor. Other embodiments use other frequencies (i.e., display rates) for signal 614, such as 48 Hertz.

Frequency correction (adjustment) circuitry 20 generates output clock 27, which is sent to video converter 610. Video converter 610 uses output clock 27 as a pixel clock for the video monitor that receives video output 614. The pixel clock scans through the pixels for each vertical period of output video signal 614.

The output timing generator 76 of video converter uses the output clock 27, along with timing information sent by controller 29 on lines 72, to generate an output vertical synchronization signal that is sent on line 49 to frequency correction circuitry 20 and also made part of video output signal 614. Controller 29 also controls video converter 610 via lines 617.

The frequency correction circuitry 20 of FIG. 10 is the same as the frequency correction circuitry 20 of FIG. 3 and operates in a similar manner.

For frame rate conversion, controller 29 calculates the intended number of clock cycles per input vertical period as follows in order to place that intended number on lines 37. The intended frequency of the output vertical synchronization signal of video output signal 614 is divided by the nominal frequency of the input vertical synchronization signal 21. The resulting fraction is then multiplied times the intended number of output clock cycles per output vertical period.

For example, if (1) the intended frequency of the output vertical synchronization signal of video output signal 614 is 72 Hertz, (2) the nominal frequency of input vertical synchronization signal 21 is 60 Hertz, and (3) the intended number of output clock cycles per output vertical period is 450,450 (for a 480p format), then the intended number of output clock cycles per input vertical period equals (72 Hertz/60 Hertz) times 450,450, which equals 6/5 times 450,450, which equals 540,540. The computer 29 then places the binary equivalent of the base ten number 540,540 on lines 37 for frequency correction circuitry 20.

As another example, if the intended frequency of the output vertical synch signal is 48 Hertz and the other terms are the same as above, then the intended number of output clock cycles per input vertical period equals (48 Hertz/60 Hertz) times 450,450, which equals 4/5 times 450,450, which equals 360,360.

Upon the start of operations, controller 29 places on line 66 a binary initial nominal frequency tuning number, which is initially loaded into latch 38.

The frequency correction circuitry will use the intended number of output clock cycles per input frame provided on lines 37 to produce an output clock 27. For example, for the 72 Hertz example referred to above, the frequency of the output clock will be 540,540 Hertz assuming a stable input vertical synchronization signal 21.

If the input vertical synchronization signal 21 is unstable and varies in frequency, then the frequency correction circuitry 20 will accordingly adjust the frequency of the output clock 27. The output vertical periods and the input vertical periods will nevertheless remain locked.

Thus, the same frequency correction circuitry 20 can be used for time base correction and for frame rate conversion.

Figure 11:
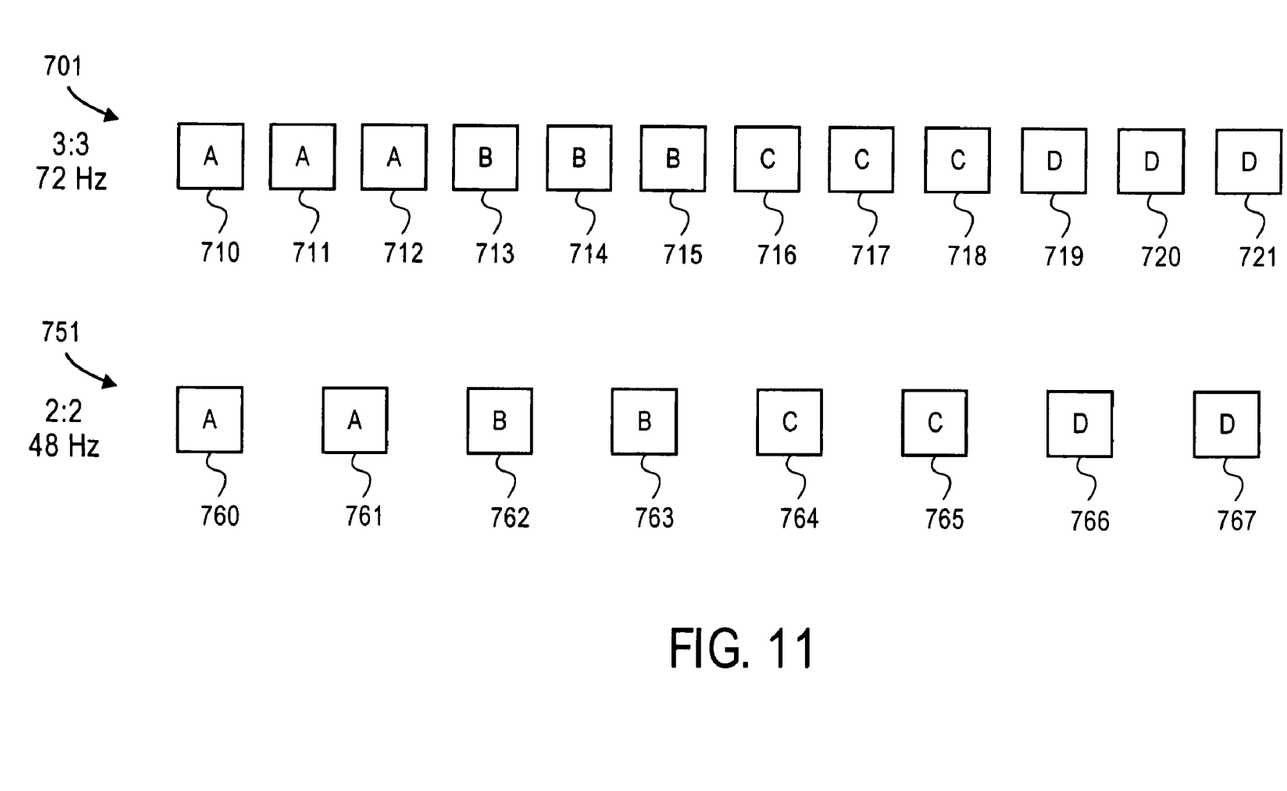
FIG. 11 shows patterns of vertical periods for a 3:3 pulldown technique and a 2:2 pulldown technique.

FIG. 11 illustrates the video output signal 614 for a 3:3 pulldown technique 701 and a 2:2 pulldown technique 751 used by video converter 610 as part of a frame rate conversion for a non-interlaced signal. For the 3:3 pulldown technique, the frequency of output vertical synchronization signal is 72 Hertz, which is three times the frame rate of 24 Hertz of a motion picture. Each video period (i.e., frame) of the video source is repeated three times. As shown in FIG. 14, frame A is repeated at points 710, 711, and 712. Frame B is repeated at points 713, 714, and 715. Frame C is repeated at points 716, 717, and 718. Frame D is repeated at points 719, 720, and 721.

For the 2:2 pulldown technique 751, the frequency of the output vertical synchronization signal is 48 hertz, which is twice the frame rate of a motion picture. Each video period (i.e., frame) is repeated twice. Frame A is repeated at points 760 and 761. Frame B is repeated at points 762 and 763. Frame C is repeated at points 764 and 765. Frame D is repeated at points 766 and 767.

For both the 3:3 pulldown technique 701 and the 2:2 pulldown technique 751, the video frames are repeated in an even manner. This contrasts with the uneven repetition of the prior art 3:2 pulldown technique shown in FIG. 2.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
   circuitry to synthesize an output video clock;
   circuitry to receive an input video synchronization signal;
   circuitry to change a frequency of the output video clock based on an intended number of video output clock cycles per input vertical period and a period of the input video synchronization signal;
   wherein the circuitry to change a frequency of the output video clock comprises:
   circuitry to generate an error signal based on a comparison of the intended number of video output clock cycles per input vertical period and an actual number of video output clock cycles per input vertical period, wherein the period of the input video synchronization signal determines a length of the input vertical period;

circuitry that receives the error signal and generates a frequency signal;
wherein the circuitry to generate an error signal comprises a counter;
wherein the circuitry that receives the error signal and generates a frequency signal comprises one or more of, multiplication circuitry, a serial generator, a trigger generator having an output coupled to the serial generator, and an accumulator;
wherein the accumulator comprises:
addition circuitry and
a latch.

2. The apparatus of claim 1,
wherein the circuitry to synthesize an output video clock comprises direct digital synthesis circuitry.

3. The apparatus of claim 1, wherein the circuitry to receive an input video synchronization signal comprises a trigger generator.

4. The apparatus of claim 1, wherein the output video clock is an output video pixel clock.

5. The apparatus of claim 1, wherein the input video synchronization signal is an input video vertical synchronization signal.

6. The apparatus of claim 1, wherein the input vertical period is one or more of an input frame and an input field.

7. A method for time base correction, comprising:
comparing on an input vertical period by input vertical period basis an intended number of output clock cycles per input vertical period with an actual number of output clock cycles per input vertical period and generating an error number based on the comparison, wherein the error number can be positive, negative, or zero;
using the error number to generate a frequency tuning number;
synthesizing an output video clock based on the frequency tuning number;
wherein comparing on an input vertical period by input vertical period basis an intended number of output clock cycles per input vertical period with an actual number of output clock cycles per input vertical period comprises:
using an input video synchronization signal to control a loading of a counter with the intended number of output clock cycles per input vertical period;
using an existing output video clock to decrement the counter;
using a resulting output of the counter as the error number.

8. The method of claim 7, wherein the input video synchronization signal is an input video vertical synchronization signal.

9. A method for time base correction, comprising:
comparing on an input vertical period by input vertical period basis an intended number of output clock cycles per input vertical period with an actual number of output clock cycles per input vertical period and generating an error number based on the comparison, wherein the error number can be positive, negative, or zero;
using the error number to generate a frequency tuning number;
synthesizing an output video clock based on the frequency tuning number;
wherein using the error number to generate a frequency tuning number comprises:
multiplying the error number to generate a frequency error number;
adding the frequency error number to a latched frequency sum number to get a frequency sum;
latching the frequency sum as a new latched frequency sum number; and
using the latched frequency sum number as the frequency tuning number.

10. The method of claim 9, wherein the multiplying is by a number that equals an integer power of two and involves a binary left shift.

11. A method for frame rate conversion, comprising:
calculating an intended number of output clock cycles per input vertical period by dividing an intended output vertical synchronization frequency by an input vertical synchronization frequency and multiplying the result by an intended number of video output clock cycles per output vertical period;
comparing on an input vertical period by input vertical period basis the intended number of output clock cycles per input vertical period with an actual number of output clock cycles per input vertical period and generating an error number based on the comparison, wherein the error number can be positive, negative, or zero;
using the error number to generate a frequency tuning number;
synthesizing an output video clock based on the frequency tuning number.

12. The method of claim 11, wherein a period of an input video synchronization signal determines a length of the input vertical period.

13. The method of claim 11, wherein comparing on an input vertical period by input vertical period basis an intended number of output clock cycles per input frame with an actual number of output clock cycles per input frame comprises:
using an input video synchronization signal to control a loading of a counter with the intended number of output clock cycles per input frame;
using an existing output video clock to decrement the counter;
using a resulting output of the counter as the error number.

14. The method of claim 13, wherein the input video synchronization signal is an input video vertical synchronization signal.

15. The method of claim 11, wherein using the error number to generate a frequency tuning number comprises:
multiplying the error number to generate a frequency error number;
adding the frequency error number to a latched frequency sum number to get a frequency sum;
latching the frequency sum as a new latched frequency sum number; and
using the latched frequency sum number as the frequency tuning number.

16. The method of claim 15, wherein the multiplying is by a number that equals an integer power of two and involves a binary left shift.

17. The method of claim 11, wherein the vertical period is one or more of a frame and a field.

18. The method of claim 11, wherein the intended output vertical synchronization frequency is one of 72 Hertz, 48 Hertz, or 24 Hertz, and the input vertical synchronization frequency is 60 Hertz.

* * * * *